G. M. PETERS.

VEHICLE DASH FRAME.

No. 9,891. Reissued Oct. 11, 1881.

Attest:
E. R. Hill.
J. McNamee.

Inventor:
George M. Peters
per Wm. Hubbell Fisher
Atty.

N. PETERS. Photo-Lithographer. Washington, D. C.

UNITED STATES PATENT OFFICE.

GEORGE M. PETERS, OF COLUMBUS, OHIO.

VEHICLE-DASH FRAME.

SPECIFICATION forming part of Reissued Letters Patent No. 9,891, dated October 11, 1881.

Original No. 224,792, dated February 24, 1880. Application for reissue filed June 15, 1881.

*To all whom it may concern:*

Be it known that I, GEORGE M. PETERS, of the city of Columbus, county of Franklin, and State of Ohio, have invented a certain new and useful Construction of Dash-Frames and Dash-Feet, of which the following is a specification.

One object of my invention is a novel construction of the dash-frame, whereby the latter is rendered light and strong, can be manufactured with little expense, and whereby the various portions of the frame are cheaply, readily, and firmly secured together, and also whereby the dash is cheaply, quickly, and firmly connected to a permanent or detachable portion of the vehicle.

Another object of my invention is a formation of a dash-foot for connecting a dash to a vehicle, whereby the foot is at once strong and light and can be cheaply manufactured.

Figure 1:
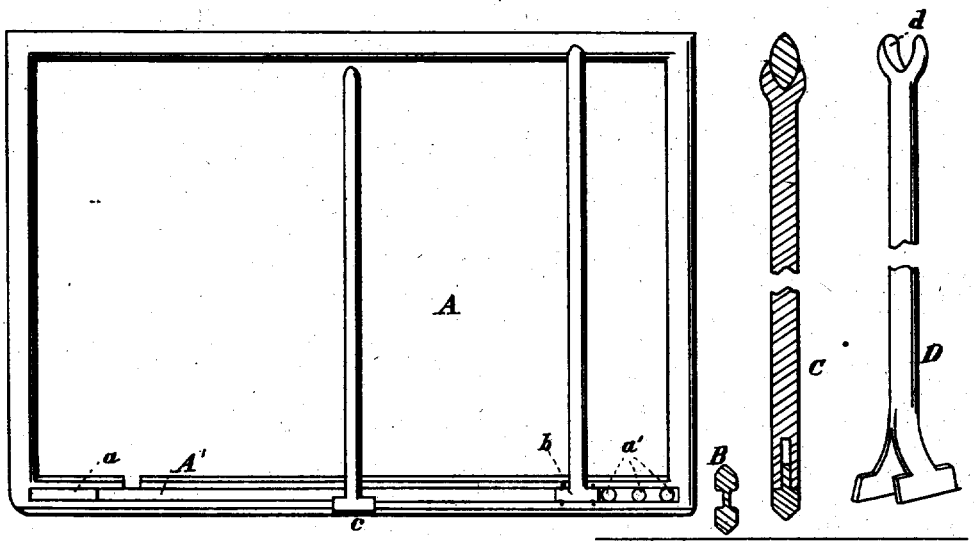
Figure 2:
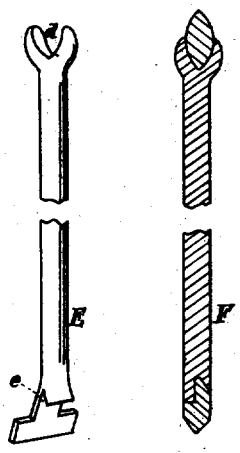
Figure 6:
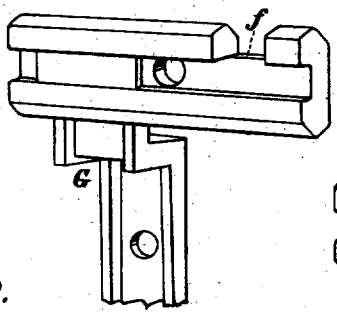
Figure 6:
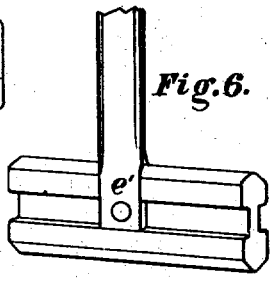
Figure 3:
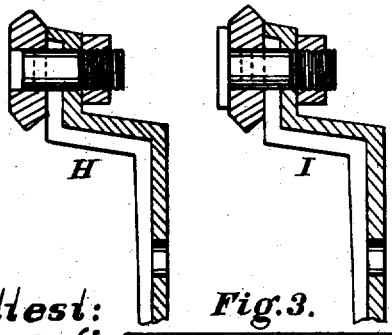

Referring to the drawings forming a part of this specification, Figure 1, A, B, C, and D represent a dash-frame constructed in accordance with my improvements, a section through the channeled lower rail of dash, and a sectional and perspective view of my special form of bar. Fig. 2, E and F are a perspective and sectional view of a modification of the mode of attaching the bar to the lower rail of the dash, where said lower rail is channeled on only one side; and G is a perspective view, showing a portion of the lower rail channeled only on one side and a channeled foot of my invention attached thereto, showing manner of attaching the foot to the lower rail by a T-headed bolt. Fig. 3, H I, Fig. 4, J K, and Fig. 5, L M, are sectional views, showing different modes of attaching the foot to the lower rail of the dash. Fig. 6 is a perspective view, showing how the extension $e'$ of the upper bar may be riveted to the thin web or channeled portion of the lower rail.

A′, Fig. 1, represents the lower rail of a dash-frame, channeled, as shown at B. This rail is provided at either end with the slot $a$ or the holes $a'$, for attaching the feet to the dash-frame. The lower ends of the upright bars of the frame are split, and each half provided with a T-head. (Shown at D, Fig. 1.) These T-heads are made of the same width as the channel in the lower rail, into which they fit. The two halves of this split end are separated from each other to admit the lower rail between them. The upper ends of the upright bars are provided with notches $d$, for the reception of the upper rail of the dash-frame.

The mode of attaching and securing the upper bars to the lower and upper rails is as follows: The two halves of the split lower end of the upright bar are placed one on either side of the lower rail, and the T-head on either half is allowed to pass the channel, as shown at $c$, Fig. 1, into which it ultimately is secured, the cleft in the end of the bar being of sufficient extent to permit it to pass. The object of this is to allow the upper end of the upright bar to pass under the top rail of the frame. When the upright bar has passed down sufficiently for this it is returned, so that the top rail fits into the notch in the upper end of the bar. The T-heads on the split lower end of the bar are now directly opposite the channel in the lower rail, and by a blow of the hammer can be forced together, the T-heads fitting into the channels on either side of the lower rail. Dents or depressions are made near the margin of the channel, (shown at $b$, Fig. 1,) forcing the edges of the channel over and against the edges of the T-heads on the lower end of the upright bar, which heads are thus securely held in the channels. By a blow of the hammer upon the sides of the upper end of the rod the sides or wings of the notch $d$ are battered against the top rail of the frame, and the upright bar is now securely fixed in its proper place.

The T head or heads may, when preferred, be secured to the rail by riveting instead of by the dents or depressions above mentioned.

When preferred, one of the limbs of the notch in the upper end of the post may, in the first instance, be bent down, in which case the cleft in the lower end of the bar need not be deeper than just sufficient to allow of the ends of the lower end of the upright fitting into their respective channels in the rail. After the upright bar has straddled the latter so that the T-heads fit into their respective channels, the upper end of the bar can be fitted to the upper rail, and the bent-down limb of said notch in the upper end of the bar then bent back, and thus the limbs of the notch be caused to embrace the sides of the upper rail.

It will be seen that by the aforesaid means the upright bars of a dash-frame are easily, quickly, and cheaply attached to the top and bottom rails.

I preferably cast the upright bars of the desired shape, the material used being malleable iron to admit of their being bent without injury when the split ends are forced together.

By constructing dash-frames in the manner described much of the expense incurred in the ordinary mode of manufacture is saved. The lower rail is made broad and flat, so that the slot *a* or holes *a'* can be made therein and leave a strong bearing for the attachment of the feet.

Should it be preferred, instead of constructing the lower rail and lower end of the upright bars as already described, the lower rail may be channeled only on one side, and the lower end of the upright bar provided with only one T-head to fit in said channel, as shown in Fig. 2. Where the neck of this single T-head joins the body of the bar a V-shaped notch, *e*, Fig. 2, is provided to fit over a correspondingly-beveled edge of the lower rail, so that when the T-head is forced into and secured in the channel in a similar manner to the securing of the bar already described the said bar is firmly secured in position.

Should it be deemed preferable, one of the arms of the T-head on the lower end of the upright bars may be left off, making the head that fits into the channel an L instead of a T head.

The T portions of the arm (or arms where there are two) on the lower end of the upright bar may be omitted, and the stub end of the arm or arms riveted to the channeled or thin portion of the lower rail. (See Fig. 6 of the drawings.)

The notch or recess *f*, Fig. 2, permits the arm or arms provided with the T or L shaped heads, or the stub end or extension *e'*, when said heads are omitted, to come in contact with the web of the channel in the lower rail or bar.

The upper end of the upright bar may be fastened in any convenient or desirable manner, although I prefer the mode herein set forth.

The wide vertical flat faces of the lower rail afford a desirable bearing for the dash-foot or vehicle-body, (as the rail can be readily perforated for bolts or rivets, and the thick edges left above and below the perforations are first-rate bearings for said foot or body,) and possess great advantages over the customary convex or oval rails, the central portion of which, being thick, renders them hard to punch, and the edges afford no flat surface for said foot or body to press against. The rail therefore, when more or less flat on one or both sides, becomes a modification of the forms of rail shown herein and possesses some of their advantages.

Irrespective of the comparative advantages derived from the bearings being flat over being otherwise shaped, the following among other advantages obtains—viz., that the web allows the rail or bar to be readily and quickly perforated, the thick parts, however shaped, connecting said web serving as supports or bearings for the attachment of the foot or other portion of the vehicle, to which the dash is connected.

G, Fig. 2, is a perspective view of the under side of my channeled or concave foot, which is attached to the lower rail of the dash-frame by a T-headed bolt, the head of the bolt fitting in the channel in the rail. A bolt having a T-head so narrow as to fit within the channel is applicable for attaching the feet only where holes, instead of a slot, are used, or where the slot is of less length or width than the channel in the rail.

Fig. 3, H represents a section through the lower rail, channeled on both sides, and the foot, with a T-headed bolt passing through a hole in the rail to secure the foot to it, the T-head fitting into the channel in the rail.

Figure 4:
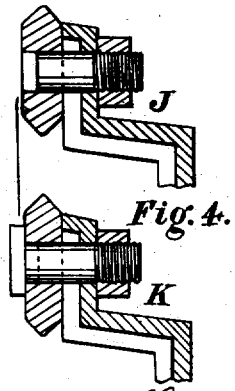

Fig. 4, J is a sectional view, representing a modification, the difference being that at J the rail is represented as channeled only on one side, and at H the rail is channeled on both sides.

Figure 5:
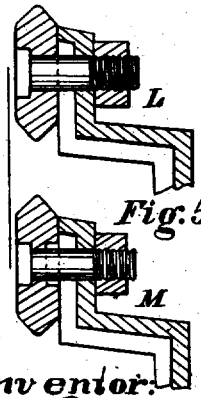

Fig. 5, L and M represent sections through the lower rail and the foot, the foot being secured to the rail by bolts the heads of which fit into the channel in the rail, the round slots or holes in the rail through which the bolts pass being of less diameter than the width of the channel. Should a slot of the same width as the channel in the rail be used instead of holes, a T-headed bolt having a head narrow enough to altogether fit into the channel cannot conveniently be used unless the bolt-head is much longer than the slot, as the head would pass through the slot. In this case I use a bolt with a head broader than the channel. (Shown at I, Fig. 3, where the rail is represented as channeled on both sides, and at K, Fig. 4, the lower rail being represented as channeled only on one side.)

Of course that feature of my invention which consists of the combination of channeled rail and the uprights may be used without the combination of channel and bolt with foot or vehicle, and vice versa.

The foot may be channeled or concaved on the opposite side to that shown and described herein, or on both sides, these forms of construction being both obvious equivalents of the one shown and described.

The depth and the length of the channel or concavity in the dash rail or foot may be varied to suit the requirements of the manufacturer.

Another advantage of that portion of my invention which relates to channeling or recessing the foot is that the same may be readily cast of malleable iron, the channeling obviating the injurious effects arising from the presence of shrunken corners in thick malleable-iron castings. The channeling or recessing of the foot enables the latter to be made light and thin and to be better annealed.

What I claim as new and of my invention, and desire to secure by Letters Patent, is—

1. A vehicle-dash whose lower bar is provided exteriorly with a channel or recess, the metal on either side of the channel or recess affording a bearing for the dash-foot or other portion of the vehicle to which the dash is connected, for the purposes specified.

2. A dash whose lower rail is composed near or at the ends of two thick portions united by an easily-perforated web, for the purposes specified.

3. A dash provided with a rail having vertically-flat sides, one or both of said sides being exteriorly channeled, substantially as and for the purposes specified.

4. In a dash-frame, an upright having its upper end split to receive an upper cross rail or bar and its lower end provided with shoulder *e* and flange or extension *e'*, substantially as and for the purposes specified.

5. In a dash-frame, the upper bar having its upper end split to receive an upper cross bar or rail and its lower end provided with shoulder *e* and flange or extension *e'*, in combination with an upper cross rail or bar and a lower cross rail or bar, the latter provided with a channel and a recess, *f*, which receives the extension and allows it to lie flat against the web, substantially as and for the purposes specified.

6. In a dash-frame, the combination of the channeled rail and the upright bar provided with one or more T-heads, substantially as and for the purposes specified.

7. In a dash-frame, the combination of the channeled rail and the upright bar provided with one or more T-heads, and the holes or slots through the rails, substantially as and for the purposes specified.

8. In combination, the rail provided with one or more channels and bolt-holes through the bar in the channel, and a T-headed bolt, substantially as and for the purposes specified.

9. In combination, the rail provided with one or more channels and bolt-holes of suitable size through the rail, the T-headed bolt, and the foot or vehicle, substantially as and for the purposes specified.

10. In combination, a dash-frame and a rail provided exteriorly with one or more channels and bolt holes or slots in the channel and through the rail, said holes being of smaller diameter or width than the width of the channel, substantially as described.

11. The foot channeled on either or both sides, substantially as and for the purposes specified.

12. In combination, the foot and channeled rail provided with bolt holes or slots, and a T-headed bolt whose head is within the channel, substantially as and for the purposes specified.

13. A channeled dash-frame adapted to be connected to a permanent or detachable portion of the vehicle, and consisting of an exterior continuously-solid frame, provided with separable inner bars or braces terminating with said exterior frame, and having a construction, substantially as described, whereby they are readily attachable to said exterior frame, substantially as and for the purposes set forth.

GEORGE M. PETERS.

Attest:
WM. E. JONES,
E. R. HILL.